Patented Jan. 31, 1939

2,145,817

UNITED STATES PATENT OFFICE 2,145,817

ZINC AMMINOCHLORIDE SOLUTION

Buren I. Stoops, Kennett Square, Pa., assignor to Hercules Powder Company, Wilmington, Del., a corporation of Delaware No Drawing. Application April 22, 1937,
Serial No. 138,367

13 Claims. (Cl. 23—97)

This invention relates to a process for producing zinc amminochloride solutions of high purity and to the product thereof.

Heretofore it has been difficult or impossible to produce a zinc chloride solution having a high degree of purity from zinciferous material contaminated with other metals which forms water-insoluble sulphides such as the heavy metals Cu, Mn, Fe, Pb, Ni, Cr, Cd, etc.

In the practice of this invention zinc amminochloride solutions which are free of or are substantially free of other metals which form sulphides that are insoluble in water, are readily produced from impure zinciferous materials containing any or all of such metals. For some purposes it is not important to remove from the solution such of the heavy metals (e. g. Ni) as do not (provided an excess of sulphide-precipitating agent, such as hydrogen sulphide, is avoided) precipitate as a sulphide before or with zinc sulphide from a solution containing ammonium hydroxide and an ammonium salt.

As an illustrative example, zinciferous raw material used in the practice of this invention may be sal skimmings containing zinc in the proportion of 40%–46%, one or more of such metals, as Fe, Pb, Al, Sn, etc., which may, respectively, be present in the proportion of .01% to 1.0%, and one or more of such metals as Cr, Ni, Mn, Cu, Cd, Ag, Ga, etc. which may, respectively, be present in substantial quantities below 0.1%. It is possible to produce from such material by the practice of this invention a zinc amminochloride solution of such purity that the presence therein of such heavy metals is determinable only by spectroscopic analysis and the content of manganese thereby determined is of the order of 5 parts per million parts of zinc, and the characteristic lines of other heavy metals are not identifiable in the spectroscope.

In the practice of this invention the zinciferous material is extracted with a large amount of ammonium hydroxide and a smaller amount of ammonium chloride in the presence of metallic zinc, and preferably also of carbon. Both metallic zinc and carbon are present in sal skimmings. The extraction produces heat and the solution may be thereby heated to the boiling point. The resulting solution is a solution of zinc amminochloride. After completion of the extraction the solution is separated from residual solids by filtration or decantation.

The quantities of ammonium hydroxide and ammonium chloride that must be used are readily determined by calculating the amounts of chlorine and of ammonia necessary to convert all of the zinc, using also the chlorine in the raw material, into zinc amminochloride, $Zn(NH_3)_4Cl_2$, and then using an excess of about 5%, of each, of the ammonium hydroxide and ammonium chloride thereby shown to be necessary.

While the resulting solution is still hot, it is blown with air, and manganese and iron are precipitated, and also some copper and lead. The precipitate is filtered out. The filtrate, preferably while at a temperature of 60° and 70° C., is subjected to oxidation as by treatment with hydrogen peroxide or potassium permanganate, and any remaining manganese, iron and copper is precipitated. The precipitate is removed, as by filtration, and a test of the clear solution for heavy metals with hydrogen sulphide ordinarily will not indicate the presence of any of those heavy metals. If such hydrogen sulphide test indicates the presence of heavy metals the solution may be given a treatment with hydrogen sulphide and any resulting precipitate removed. The filtrate will contain alkali and alkali earth metals which were present in, or introduced into, the original material.

Apparently the critical feature of the process whereby success in the production of pure zinc amminochloride solution is achieved, is that during the initial extraction of the zinciferous material the metallic zinc, being, in the electromotive series, above all impurities present except manganese, aluminum, alkali and alkali earth metals, and preferably being in the presence of carbon, displaces any other metal that tends to go into solution and the impurities remain in the initial residue. The application of this theory is indicated by the fact that extraction should be stopped before the metallic zinc present has been consumed.

Sal skimmings useful in the practice of this invention vary widely in composition, examples of ordinary laboratory analyses, which are widely different but do not necessarily represent the limits of the usable range of variation, are as follows:

*Sal No. 1*

| Element | Percent (dry basis) |
|---|---|
| Zinc | 58.60 |
| Iron | 0.59 |
| Nickel | Nil |
| Copper | 0.08 |
| Lead | 0.65 |
| Chlorine | 18.40 |
| Manganese | Up to 0.1 |

*Sal No. 2*

| | |
|---|---|
| Zinc | 45.55 |
| Chlorine | 38.35 |
| Iron, manganese, etc., as $Fe_2O_3$ | 1.00 |

A specific example of the application of the foregoing process is as follows:

An extraction was made on sal sample No. 2 as follows:

| | Grams |
|---|---|
| Sal skimmings | 2,000 |
| Ammonium hydroxide (25% NH3) | 2,880 |
| Ammonium chloride | 460 |

The ammonium chloride was dissolved in the ammonium hydroxide and the sal skimmings was added using air agitation. Any suitable method of agitation could have been used instead of air. However, air tends to oxidize the iron and manganese during the extraction. After extraction of the zinc, the material was filtered to remove the residue and the filtrate was air blown to further oxidize the iron and manganese. The precipitate formed was filtered off and the filtrate was treated with a solution of one gram of potassium permanganate in water solution. The precipitate formed was filtered off and the filtrate submitted for spectroscopic analysis. The analysis showed manganese on basis of the zinc content as 4 parts of manganese per million parts of zinc, and all other metal impurities were absent except, the alkali and alkaline earth metals. No hydrogen sulphide is used in this process unless the final test shows the presence of heavy metals that would form water-insoluble, colored sulphides, such as, the sulphides of copper, lead, cadmium, etc.

Not only had it been difficult or impossible heretofore to produce a pure zinc chloride or amminochloride solution, but zinc sulphide of good quality could not be formed from such zinc chloride solutions as had been made. However, zinc salt solutions made in accordance with this invention will produce, especially in accordance with the procedure of the co-pending application of Donald G. Morrow, Serial No. 22,583, filed May 21, 1935, zinc sulphide pigments of high purity, whiteness and light resistance as therein more specifically identified. In accordance with that procedure the purified zinc amminochloride solution having a concentration of 160 to 200 gr. of Zn per liter, being at a temperature between 50° and 80° C., containing a high concentration of, or being saturated with, or containing an excess of ammonia, and while being agitated, is contacted with hydrogen sulphide, preferably carrying 25 to 50% of a diluent gas, and the desired high concentration of ammonia is maintained and the supply of hydrogen sulphide is stopped before any substantial excess thereof is used. The resulting precipitate is washed, preferably with ammonium hydroxide, to a content of less than 0.2% of salts and contains after washing 2.0% to 2.5% of ammonia so associated with the ZnS that it is not removed by drying to constant weight at 120° C. After drying, calcining, milling, drying and disintegrating, the resulting zinc sulphide pigment is of high purity, is inherently alkaline without end-pointing or alkalizing treatment, contains less than about .001% of metals other than zinc, and has a pH of 8 to 9. The action of the purified zinc amminochloride solution of this invention in that process and the purity of the final product constitute a definite identification of the properties of the purified zinc amminochloride solution.

Spectroscopic analyses of the purified zinc amminochloride solutions made in accordance herewith have revealed an average of less than 5 parts and usually about 4 parts or less of manganese per million parts of zinc, and the characteristic lines of other heavy metals have been unidentifiable. The zinciferous raw materials above proposed for use in the practice of this invention will ordinarily contain metallic zinc and carbon but either may be added as desired. While reference is made herein, particularly in the claims, to the extraction of impure zinciferous raw material with an aqueous solution of ammonia and ammonium chloride, it is within the spirit of this invention to bring the zinciferous material into contact with ammonia and ammonium chloride by forming ammonium chloride by the action of ammonia upon any chloride that will be decomposed to form ammonium chloride, although it is recommended that in producing a solution of ammonia and ammonium chloride in such manner care be taken to avoid objectionable contamination of the final zinc amminochloride solution.

I claim:—

1. In a method of preparing zinc salt solutions of high purity having the composition $$Zn(NH_3)_4Cl_2$$

the step of dissolving impure zinciferous materials in an aqueous solution of ammonia and ammonium chloride, while maintaining metallic zinc and carbon present.

2. A method of the character described, which comprises treating zinc waste materials, containing chlorine and also containing other metals which form water-insoluble sulphides, with aqueous solution of ammonia and ammonium chloride while maintaining metallic zinc present, to obtain a zinc amminochloride solution, the ammonium hydroxide and ammonium chloride content of said aqueous solution being slightly in excess of the calculated amount necessary to convert all of the zinc to zinc amminochloride, the chlorine content of said materials being included in said calculations, separating the solution from any residue, subjecting the clear solution to oxidation, and then removing precipitate to obtain a clear solution.

3. A method of the character described, which comprises treating zinc waste materials, containing other metals which form water-insoluble sulphides, with aqueous solution of ammonia and ammonium chloride while maintaining metallic zinc present, to obtain a zinc amminochloride solution, the zinc amminochloride having the composition $Zn(NH_3)_4Cl_2$, separating the solution from any residue, subjecting the clear solution to air blowing and to action of an oxidizing agent, and then removing precipitate to obtain a clear solution.

4. A method of the character described, which comprises treating zinc waste materials, containing other metals which form water-insoluble sulphides, with aqueous ammoniacal solution of ammonia and ammonium chloride while maintaining metallic zinc present, to obtain a zinc amminochloride solution, the zinc amminochloride having the composition $Zn(NH_3)_4Cl_2$, separating the solution from any residue, subjecting the clear solution while at a temperature above 60° C. to oxidation, and then removing precipitate to obtain a clear solution.

5. A method of preparing zinc-containing solutions of high purity adapted for use in the manufacture of pigments, which comprises treating impure zinc waste materials with a large amount of ammonium hydroxide and a smaller amount of ammonium chloride in the presence of metallic zinc to obtain a solution containing zinc amminochloride, separating the solution from residue, oxidizing the solution at about 60° to 70° C. to precipitate impurities, and then filtering to obtain a clear solution of a zinc salt.

6. A method of the character described, which comprises treating impure zinciferous materials with an aqueous solution containing ammonium hydroxide and ammonium chloride to obtain a solution containing zinc amminochloride having the composition $Zn(NH_3)_4Cl_2$, removing solid material from the solution, blowing the solution with air to precipitate impurities, adding an oxidizing agent to the solution, removing precipitate from the solution, then treating said solution with hydrogen sulphide and removing the precipitate formed by such treatment from the solution.

7. A method of the character described, which comprises treating impure zinciferous materials in the presence of metallic zinc with an aqueous solution containing ammonium hydroxide and ammonium chloride to obtain a solution containing zinc amminochloride, the ammonium hydroxide and ammonium chloride content of said aqueous solution being slightly in excess of the calculated amount necessary to convert all of the zinc to zinc amminochloride, any chlorine content of said materials being included in the calculations, removing solid material from the solution, subjecting the solution to oxidation, and removing precipitate from the solution, then treating said solution with hydrogen sulphide to precipitate heavy metals that would form water insoluble colored sulphides and removing said heavy metals as precipitates.

8. In the process of preparing zinc salt solutions of zinc amminochloride of high purity having the composition $Zn(NH_3)_4Cl_2$ the step of dissolving impure zinciferous materials in an aqueous solution of ammonia and ammonium chloride while maintaining metallic zinc present.

9. In the process of preparing zinc salt solutions of zinc amminochloride of high purity, the step of dissolving impure zinciferous materials containing chlorine in an aqueous solution of ammonia and ammonium chloride while maintaining metallic zinc present, the ammonium hydroxide and ammonium chloride content of said aqueous solution being about 5% in excess of the calculated amount necessary to convert all of the zinc to zinc amminochloride, the chlorine content of said materials being included in the calculations.

10. In the process of preparing zinc salt solutions of zinc amminochloride of high purity, the step of dissolving impure zinciferous materials containing chlorine in an aqueous solution of ammonia and ammonium chloride while maintaining metallic zinc present, the ammonium hydroxide and ammonium chloride content of said aqueous solution being slightly in excess of the calculated amount necessary to convert all of the zinc to zinc amminochloride, the chlorine content of said materials being included in the calculations.

11. In the process of preparing zinc salt solution of zinc amminochloride of high purity, the steps of dissolving impure zinciferous materials containing chlorine in an aqueous solution of ammonia and ammonium chloride while maintaining metallic zinc present, the ammonium hydroxide and ammonium chloride content of said aqueous solution being about 5% in excess of the calculated amount necessary to convert all of the zinc to zinc amminochloride, the chlorine content of said materials being included in the calculations, separating the solution from any residue, subjecting the clear solution to air blowing and to action of an oxidizing agent and then removing precipitates to obtain a clear solution.

12. In the process of preparing zinc salt solution of zinc amminochloride of high purity, the steps of dissolving impure zinciferous materials containing chlorine in an aqueous solution of ammonia and ammonium chloride while maintaining metallic zinc present, the amomnium hydroxide and ammonium chloride content of said aqueous solution being about 5% in excess of the calculated amount necessary to convert all of the zinc to zinc amminochloride, the chlorine content of said materials being included in the calculations, separating the solution from any residue, subjecting the clear solution to air blowing and to action of an oxidizing agent, then removing precipitates to obtain a clear solution, then treating said solution with hydrogen sulphide to precipitate heavy metals which form water insoluble colored sulphides and removing said heavy metals as precipitates.

13. In the process of preparing zinc salt solution of zinc amminochloride of high purity, the steps of dissolving impure zinciferous materials containing chloride in an aqueous solution of ammonia and ammonium chloride while maintaining metallic zinc and carbon present, the ammonium hydroxide and ammonium chloride content of said aqueous solution being about 5% in excess of the calculated amount necessary to convert all of the zinc to zinc amminochloride, the chlorine content of said materials being included in the calculations, separating the solution from any residue, subjecting the clear solution to air blowing and to action of an oxidizing agent, then removing precipitates to obtain a clear solution, then treating said solution with hydrogen sulphide to precipitate heavy metals which form water insoluble colored sulphides and removing said heavy metals as precipitates.

BUREN I. STOOPS.

CERTIFICATE OF CORRECTION.

Patent No. 2,145,817.                                          January       1939.

BUREN I. STOOPS.

It is hereby certified that error appears in the printed specification of the above numbered patent requiring correction as follows: Page 1, second column, line 7, strike out "and" appearing in italics and insert instead the same word in roman type; page 3, second column, line 26, claim 12, for "amomnium" read ammonium; line 43, claim 13, for "chloride" read chlorine; and that the said Letters Patent should be read with this correction therein that the same may conform to the record of the case in the Patent Office.

Signed and sealed this 28th day of March, A. D. 1939.

Arsdale.                                              Henry Van Arsdale.

(Seal)                                                Acting Commissioner of Patents.